Figure 1:
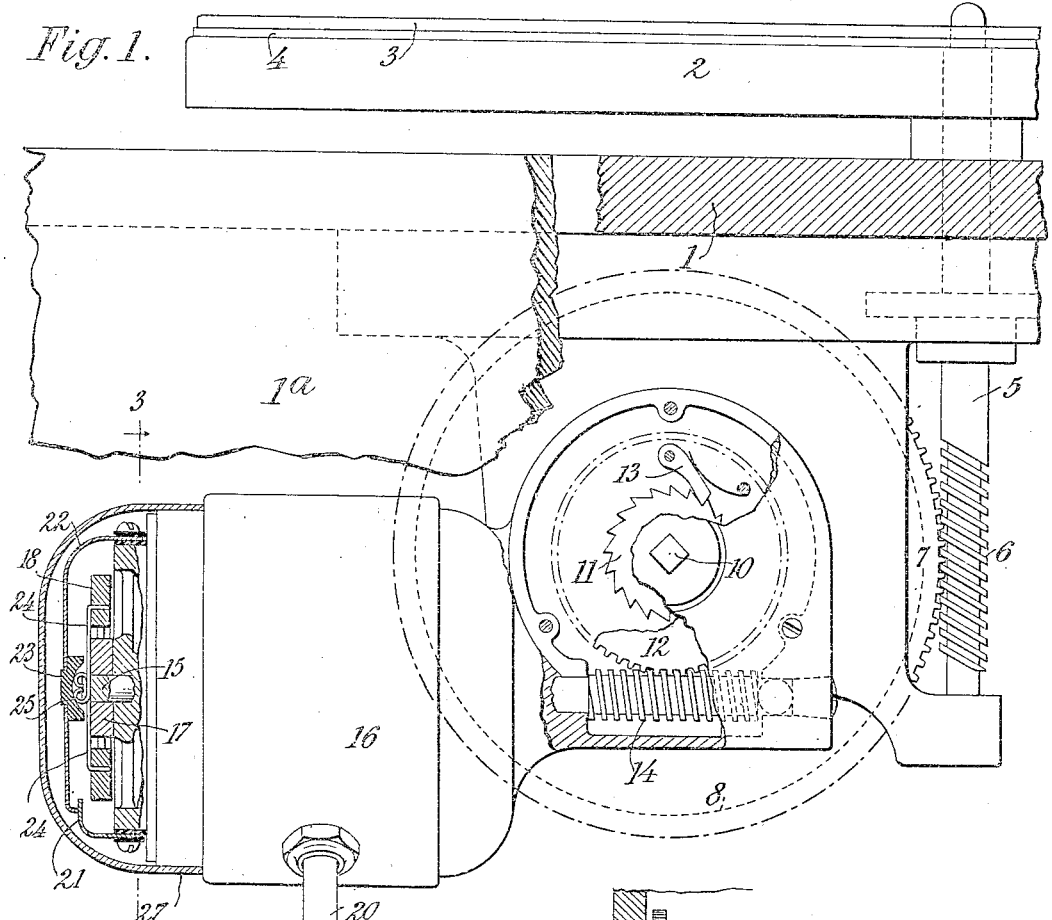

W. G. SHELTON.
WINDER FOR SPRING MOTORS.
APPLICATION FILED JUNE 27, 1916.

1,205,572.

Patented Nov. 21, 1916.
2 SHEETS—SHEET 1.

WITNESSES:

INVENTOR:
William Gentry Shelton
By Attorneys,
Fraser, Furd & Myers

W. G. SHELTON.
WINDER FOR SPRING MOTORS.
APPLICATION FILED JUNE 27, 1916.

1,205,572.

Patented Nov. 21, 1916.
2 SHEETS—SHEET 2.

WITNESSES:

INVENTOR:
William Gentry Shelton
By Attorneys,

UNITED STATES PATENT OFFICE.

WILLIAM GENTRY SHELTON, OF NEW YORK, N. Y.

WINDER FOR SPRING-MOTORS.

1,205,572.

Specification of Letters Patent. Patented Nov. 21, 1916.

Application filed June 27, 1916. Serial No. 106,221.

*To all whom it may concern:*

Be it known that I, WILLIAM GENTRY SHELTON, a citizen of the United States of America, residing in the borough of Manhattan, city, county, and State of New York, have invented certain new and useful Improvements in Winders for Spring-Motors, of which the following is a specification.

This invention relates to mechanism for winding spring motors, it being so constructed and adapted that upon being set in motion it will continue its operation until the spring is wound to a predetermined condition of tension, whereupon the motor is stalled and immediately upon stalling breaks its electric circuit, which circuit remains broken until again intentionally closed by some suitable means, preferably by the actuation of the operator or attendant.

In the drawings accompanying this specification, one practicable embodiment of the mechanism is illustrated in connection with the spring motor of a talking machine, in which drawings,—

Figure 2:
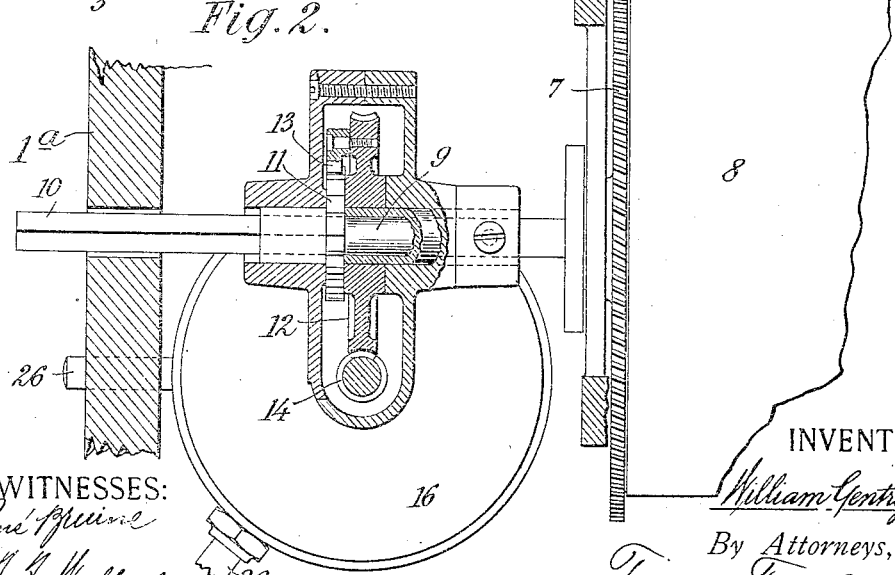
Figure 3:
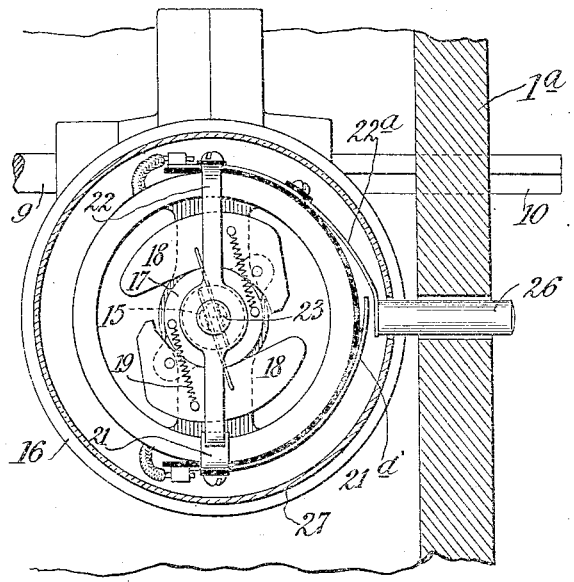
Figure 4:
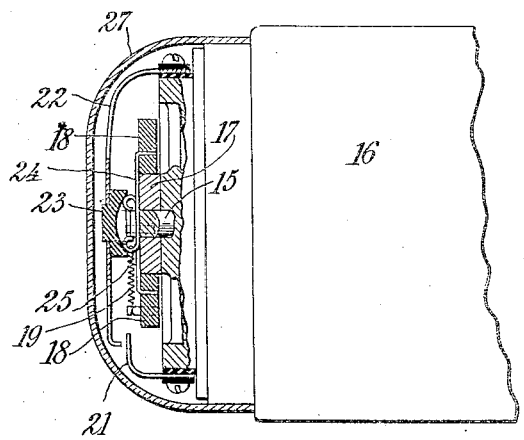

Figure 1 represents the winding motor in side elevation and the spring motor in end elevation, together with various associated parts of a talking machine, some of which being broken away. Fig. 2 is an end elevation of the winding motor. Fig. 3 is a section taken on a plane at about the line 3—3 of Fig. 1; and Fig. 4 is a view at about right angles to the plane of Fig. 3, showing parts of the switch in the position they assume when the motor is stalled. In Fig. 1 these parts are shown in the closed circuit and running position.

The table 1 of a talking machine is illustrated. This table really is the top of a box, the side of the box being illustrated at 1ª. There is mounted above the table a rotary platen 2 carrying a record disk 3, there being interposed between the platen and the disk a suitable layer 4, as for instance felt. The platen is driven by a shaft 5 having a worm 6 meshing with a worm wheel 7 carried by the spring barrel 8 of the spring motor. The spring motor is connected with a shaft 9 in a well-known manner and has one end 10 which projects through the casing, and is preferably provided with a square end for receiving the winding crank which may readily be applied and removed when desired.

The necessity of winding various spring-operated mechanisms by hand, as for instance talking machines, is quite annoying and, in fact, undesirable at times. In cases where it is desired to waste as little time as possible between the changing of record disks, it is also of advantage to be able to wind the spring motor by power during the time the attendant is removing one disk and replacing another. It is, in connection with such winding mechanism, of the greatest importance that the operator shall be assured of two things; first, that the power driven winder will upon bringing the spring to the proper tension, instantly stop working, and second, that it will not commence working until it is desired that it shall commence its operation. If the winder commences its operation automatically and without reference to the action of the repeating portions of the talking machine, it frequently happens that the winding will spontaneously or automatically commence at a portion of the reproduction where even the slightest noise of the mechanism becomes very undesirable. At other times it may be more desirable to have the mechanism wound during the reproduction period, as for instance if it is more desirable when the talking machine is being used to play dance music, that there shall be no interruption. In this instance, one acquainted with the music being played can start the winding at those portions of the music where the slight noise of the winder will not be materially noticed.

As a means of connection between the spring motor shaft 9 and the winding motor, there is shown a ratchet wheel 11 fast with the said shaft. This ratchet wheel preferably has a squared opening removably engaged on the squared end 10 of such shaft. A worm wheel 12 is shown mounted concentrically with the said shaft and ratchet wheel, but normally free from these when running in one direction and coupled thereto by means of a pawl 13 when running in the opposite direction, that is, the pawl and ratchet are so constructed that the winding motor is operative for driving the worm wheel 12 forward by means of the worm 14 on the motor shaft 15. The pawl engages the ratchet and is effective for rotating the shaft 9 in the winding direction. When, however, such shaft is rotated in the winding direction by means of the hand crank, the ratchet wheel 11 slips idly past the pawl 13.

The most efficient manner of assuring the stoppage of the motor winding operation is to so proportion the power of the motor, the motor being represented in the present illustration by the reference character 16, and the power of the spring to be wound, that when the spring is wound to the proper tension the motor will be stalled. Upon stalling an electric motor it is then desirable that the circuit be broken and electrical energy cut off from the winding of the motor. To this end I have embodied in my improved winding motor a form of the automatic switch described in my co-pending application, Ser. No. 84,869, filed March 17, 1916, the switch being so organized that upon the stalling of the motor the circuit is immediately broken.

The present form of automatic switch, while embodying the basic principles set forth in my above referred to application, nevertheless contains some particular features rendering it peculiarly adapted to the present installation.

In the illustration, the motor shaft 15 is shown provided at its end with a hub 17 to which are pivotally mounted a pair of weights 18 adapted to act after the analogy of governor weights. Each of these weights is drawn inwardly toward the shaft by means of an extension spring 19, and upon rotation of the shaft is moved outwardly against the action of such spring. The current is shown led into the motor from some suitable source by means of a cable 20. The circuit breaker herein illustrated comprises a contact member 21 and a spring contact member 22. These two members are, by virtue of the resiliency of such member 22, normally in contact for closing the circuit. The spring member 22 is shown carrying a saucer-shaped engaging button 23 having the center of its concave surface located in alinement with the center of the shaft 15. Each weight 18 is shown pivotally carrying an actuator 24, such actuator being illustrated in the form of a wire having a bent over end entering a hole in the weight and having its free end crossing the motor shaft when the weights are in idle position, such free end being provided with a loop 25, such actuators and loops being so proportioned relatively to the parts that when the weights are thrown out, due to the centrifugal action of the motor shaft, the loops substantially coincide as illustrated in Fig. 1, and are located within the deepest portion of the saucer 23, whereby the spring contact 22 is permitted to act and come into engagement with its coöperative contact 21. When, however, the motor shaft is at rest and the weights 18 are drawn inwardly responsive to their springs, the actuator and loops 25 are pressed across the shaft in opposite directions and engage the sloping sides of the saucer 23 and raise the member 22 against the action of its spring, thereby separating the members 21 and 22 and interrupting the circuit. The members 21 and 22 are shown formed of sheet metal and respectively provided with transverse straps 21$^a$ and 22$^a$ to form a circuit closer controlled by a button 26. This button is shown extending through the side 1$^a$ of the machine casing and is preferably located on the same side as that through which the crank-engaging end of the shaft 9 extends. The push button 26 is shown held in position adjacent the normally separated ends of the straps 21$^a$ and 22$^a$ by means of a hole in a removable cap 27 forming a part of the motor casing.

The operation of the device is substantially as follows: When it is desired to wind the spring motor by means of the power driven motor, the crank handle is preferably removed from the spring motor shaft 9. The operator then, whenever occasion may arise for rewinding the spring motor merely presses the push button 26 which establishes the motor circuit through the contacts 21$^a$ and 22$^a$ and immediately starts the operation of the motor. Upon the motor shaft assuming the necessary momentum to throw the governor weights 18 outwardly, the moving of the loops 25 into the deepest part of the saucer 23 permits the circuit to be established between the contacts 21 and 22. The finger may then be removed from the push button whereupon the circuit is maintained closed through the spring action of the member 22. The motor shaft 15 rotates the worm wheel 12 by means of the worm 14, and through the dog or pawl 13 carried by such wheel rotates the spring motor shaft 9 and winds the spring of the spring motor. Upon the spring being wound up either to the limit to which it can be wound or to the limit of the power of the motor, the motor thereupon becomes stalled. The term stalled when herein applied to the motor is intended to refer to either the complete stoppage of the rotary element of the motor or the very material reduction of the speed of such element. Immediately upon the stalling of the motor the weights 18 are drawn inwardly to their idle position and the actuators 24 caused to act upon the shallow part of the saucer 23 and raise the contact 22 from the contact 21, whereupon the circuit is cut off from the motor and is not again reëstablished until this is done by intention or desire.

It is to be understood that the mechanism herein shown and described is an illustrative example of the invention and that changes may be made within the scope of the claims without departing from the spirit of the invention.

What I claim is:—

1. In a winder for spring motors, the combination with means for attachment to the winding element of a spring motor, of an electric motor for driving said attachment means, and an automatic switch in the motor circuit adapted to break such circuit when the motor is stalled.

2. In a winder for spring motors, the combination with a driving part adapted for attachment to the arbor of a spring motor, of an electric motor for operating the same, the driving force of said motor being so proportioned that the motor will be stalled upon the completion of a predetermined amount of spring winding, and an automatic switch associated with said motor and adapted for breaking the circuit thereof upon the motor being stalled.

3. The combination with a part adapted for attachment to the shaft of a spring motor, of means for electrically driving such part, a switch controlling the circuit thereof, and an automatic switch for opening the circuit upon the stoppage of such part.

4. The combination with a part adapted to be connected to the shaft of a spring motor, of an electric motor for driving the same, said motor having a spindle, a pair of weights pivoted to the said spindle and movable in a plane radially to the axis of rotation thereof, a circuit closer comprising a resilient contact member normally adapted to move to its circuit closing position, a saucer-shaped device carried by said resilient member, actuators carried by said weights and comprising bars having members adapted to lie under the deepest part of the said saucer-shaped member when the weights are moved outwardly incident to centrifugal force and adapted to engage the shallower portions of said saucer-shaped member and move said resilient contact member into its circuit breaking position upon the inward movement of the said weights.

5. In a device of the character described, the combination with a spring motor, of an electric motor adapted to wind the same and so proportioned in strength to the strength of the spring that the electric motor becomes stalled upon a predetermined amount of winding of the spring, and an automatic switch for breaking the circuit of such electric motor upon the same being stalled.

6. In a device of the character described, the combination with a spring motor, of an electric motor adapted to wind the same and so proportioned in strength to the strength of the spring that the electric motor becomes stalled upon a predetermined amount of winding of the spring, an automatic switch for breaking the circuit of such electric motor upon the same being stalled, and manually operated means for closing the circuit of said motor.

7. In a device of the character described, the combination with a spring motor provided with a winding shaft, of a removable crank carried by said shaft, an electric motor comprising a part connected to said shaft by pawl and ratchet mechanism, whereby the said shaft may be rotated independently of said electric motor, said electric motor being adapted to stall upon winding the spring to a predetermined tension, manually operated means for closing the circuit of the said electric motor, and an automatic switch for breaking the said circuit upon the stalling of the electric motor.

In witness whereof, I have hereunto signed my name in the presence of two subscribing witnesses.

WILLIAM GENTRY SHELTON.

Witnesses:
   Chas. Lyon Russell,
   Thomas F. Wallace.